United States Patent
Ho

(10) Patent No.: US 8,624,113 B2
(45) Date of Patent: Jan. 7, 2014

(54) DEVICE HOUSING AND MANUFACTURING METHOD

(75) Inventor: Po-Feng Ho, New Taipei (TW)

(73) Assignee: FIH (Hong Kong) Limited, Kowloon (HK)

( * ) Notice: Subject to any disclaimer, the term of this patent is extended or adjusted under 35 U.S.C. 154(b) by 96 days.

(21) Appl. No.: 13/336,012

(22) Filed: Dec. 23, 2011

(65) Prior Publication Data
US 2013/0043054 A1 Feb. 21, 2013

(30) Foreign Application Priority Data
Aug. 15, 2011 (CN) .......................... 2011 1 0232307

(51) Int. Cl.
*H05K 5/00* (2006.01)
(52) U.S. Cl.
USPC ........................................ 174/50; 361/679.01

(58) Field of Classification Search
USPC .......................... 174/50; 361/679.01, 679.55
See application file for complete search history.

(56) References Cited

U.S. PATENT DOCUMENTS 5,452,139 A * 9/1995 Schrott .......................... 359/871
8,441,784 B2 * 5/2013 Tang et al. ................ 361/679.24

* cited by examiner

*Primary Examiner* — Dhirubhai R Patel
(74) *Attorney, Agent, or Firm* — Altis Law Group, Inc.

(57) ABSTRACT

A housing includes a transparent panel and a housing body. The housing body includes a main body and a flange portion extending from the main body. The filler is formed between the transparent panel and the housing body. The filler includes a first connecting portion, a second connecting portion, and a support portion integrally formed together, the first connecting portion connecting the transparent panel to the flange portion, the support portion supporting the transparent panel, and the second connecting portion connected to the housing body.

8 Claims, 3 Drawing Sheets

DEVICE HOUSING AND MANUFACTURING METHOD

BACKGROUND

1. Technical Field

The present disclosure generally relates to housing manufacturing, particularly to a device housing having an improved seal and a method for manufacturing the device housing.

2. Description of Related Art

Many portable electronic devices includes a transparent panel assembled in a housing. When the housing is made of metal, the transparent panel is usually adhered to the metal housing. A cushion may be positioned around the transparent panel to protect the transparent panel.

However, it can be difficult to tightly bond the cushion to the metal housing. Thus, water, gas, or dust easily enters the housing through any clearances between the cushion and the metal housing. Additionally, the cushion is often manually positioned on the housing during manufacture, via application of viscose glue to the cushion followed by direct attachment thereof to the housing. Such process can reduce processing efficiency and increase production times and is prone to human error.

Therefore, there is room for improvement within the art.

BRIEF DESCRIPTION OF THE DRAWINGS

Many aspects of the device housing and the method for manufacturing the device housing can be better understood with reference to the following drawings. The components in the drawings are not necessarily to scale, the emphasis instead being placed upon clearly illustrating the device housing and the method for manufacturing the device housing. Moreover, in the drawings, like reference numerals designate corresponding parts throughout the several views.

DETAILED DESCRIPTION

Figure 1:
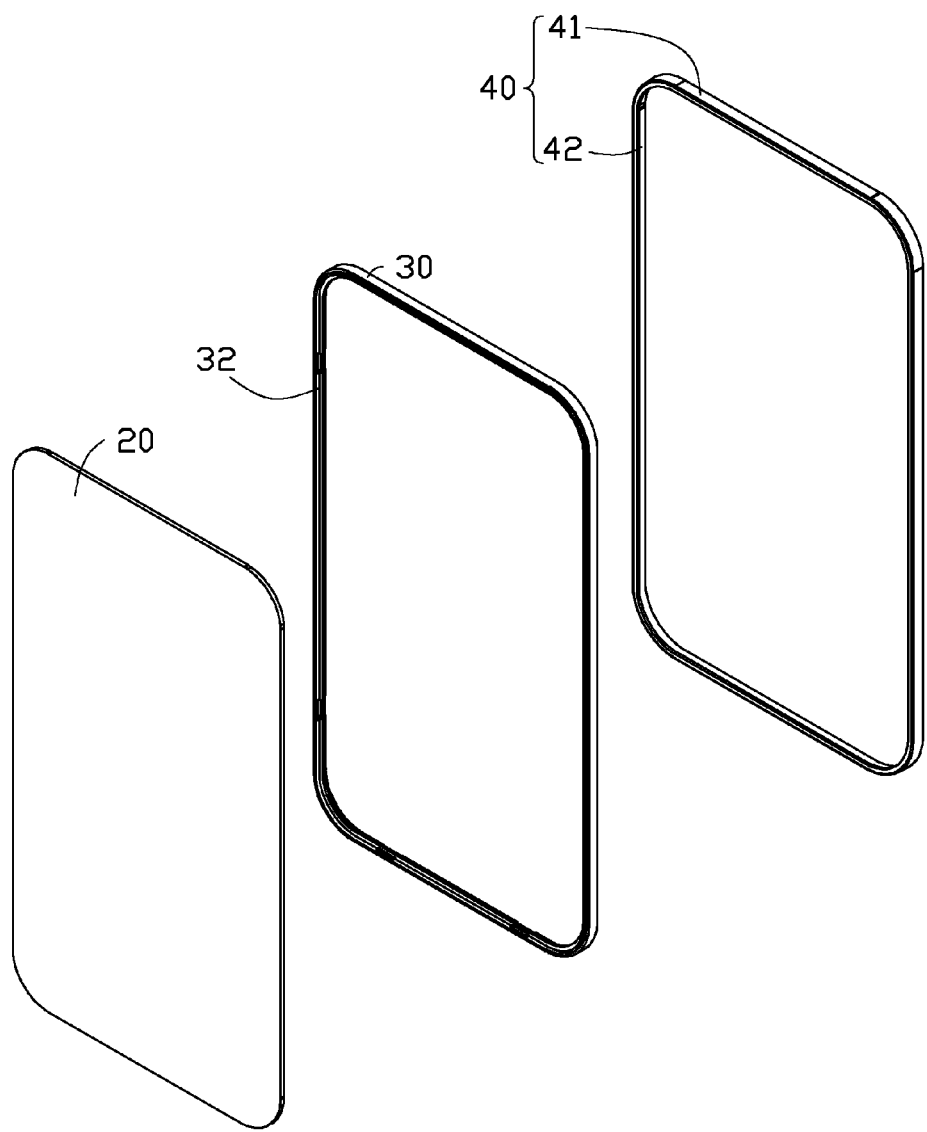
FIG. 1 is a schematic, exploded view of an exemplary embodiment of a housing.
Figure 2:
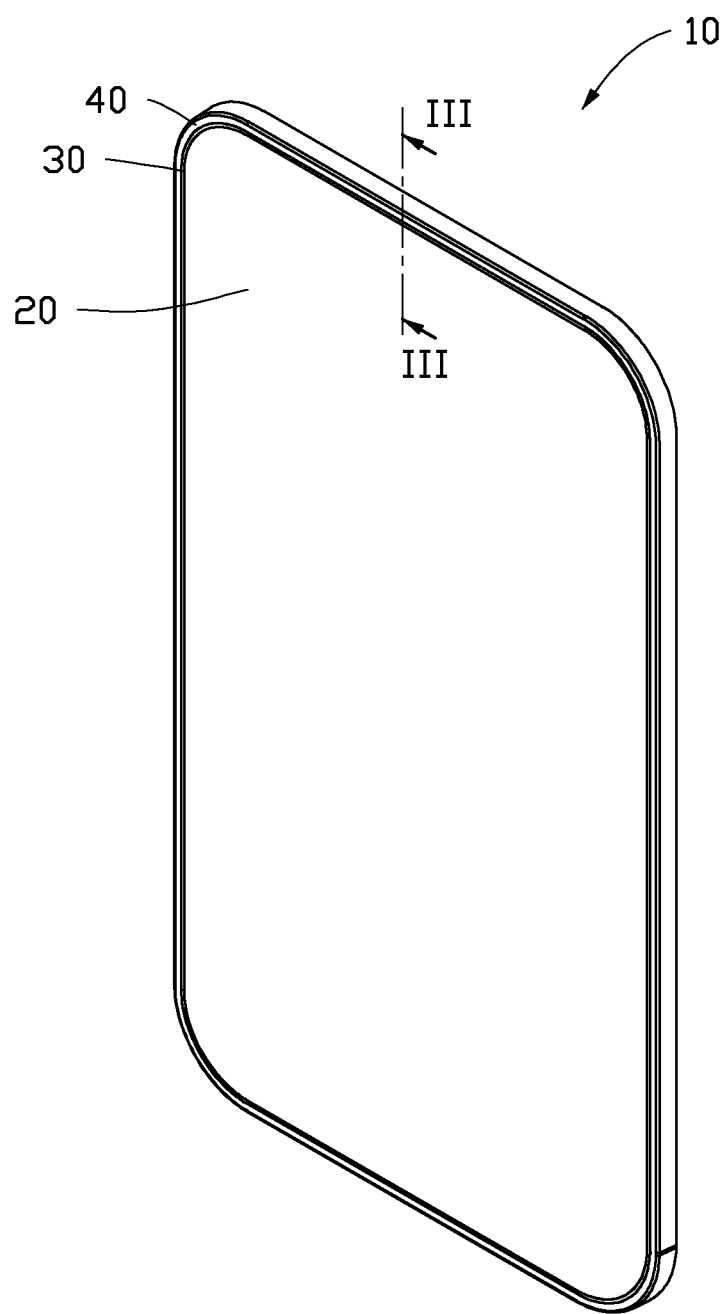
FIG. 2 is a schematic view of the assembly housing.
Figure 3:
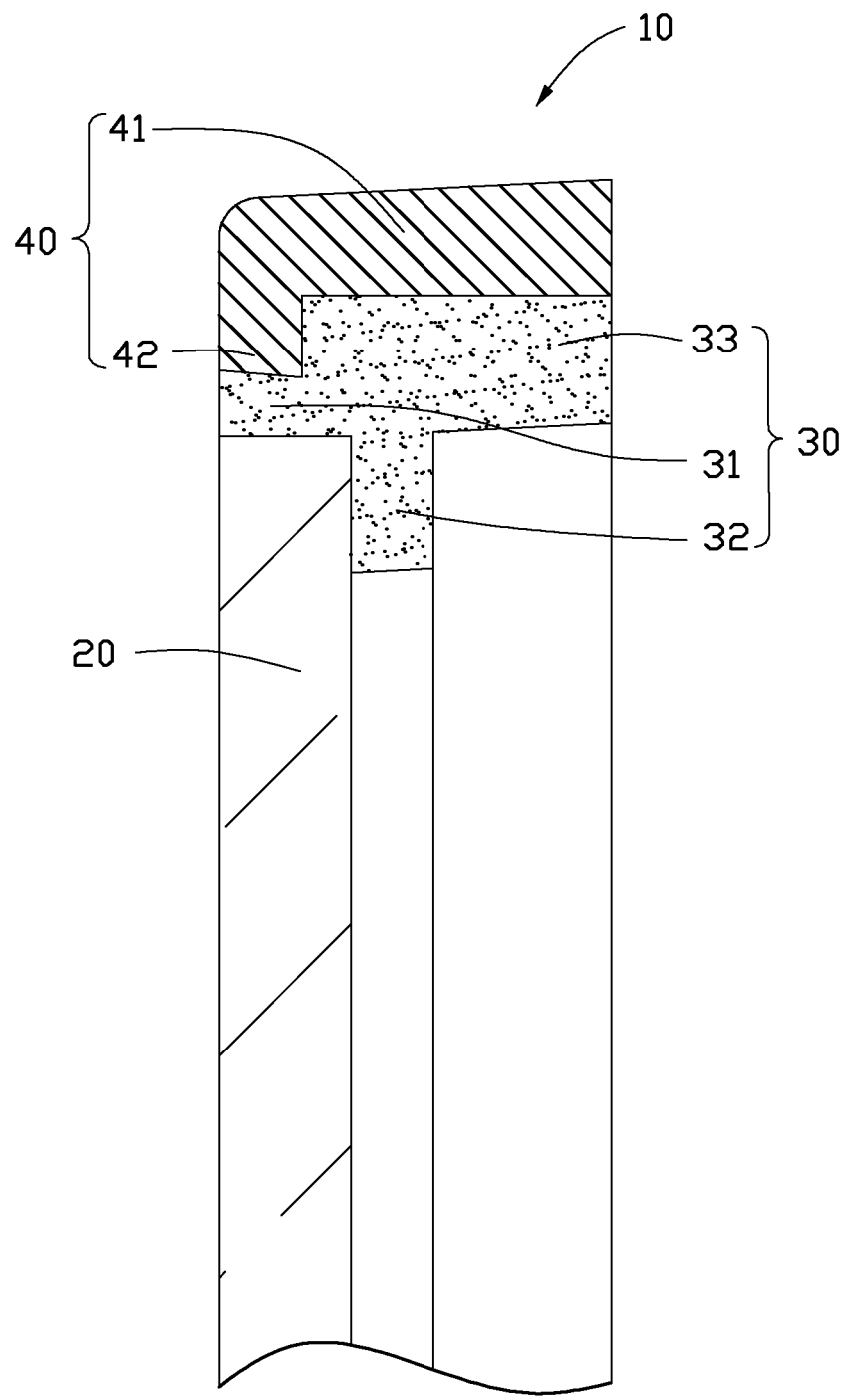
FIG. 3 is a partial view of the housing shown in FIG. 2 in cross-section taken along line III-III.

Referring to FIG. 1, in an exemplary embodiment, a housing 10 of a portable electronic device includes a transparent panel 20 and a metal housing body 40. A filler 30 is molded between the transparent panel 20 and the metal housing body 40 for sealing the housing 10.

The transparent panel 20 is configured for being received in the metal housing body 40. The transparent panel 20 may be made of glass or plastic (e.g., acrylonitrile butadiene styrene (ABS)). The metal housing body 40 is substantially a metal frame, and includes a main body 41 and a flange portion 42 substantially perpendicularly extending from the main body 41. In this embodiment, the metal housing body 40 is made of stainless steel, and may be formed by stamping or punching from a metal sheet. A clearance between the metal housing body 40 and the transparent panel 20 is in a range of about 0.4 mm to about 0.8 mm. In this embodiment, the clearance is 0.5 mm.

The filler 30 is formed between the transparent panel 20 and the metal housing body 40 by injection molding. The filler 30 includes a first connecting portion 31, a second connecting portion 33, and a support portion 32 extending from the inside of the filler 30. The first connecting portion 31 is narrower than the second connecting portion 33, and is molded between the flange portion 42 and the panel 20. The second connecting portion 33 is bonded to the main body 41. The support portion 32 is bonded to the underside of the transparent panel 20. The filler 30 can be formed by injection molding a moldable material. The moldable material can be any of polypropylene (PP), polycarbonate (PC), polyethylene terephthalate (PET) and polymethyl methacrylate (PMMA). When the transparent panel 20 is made of plastic, the chosen material of the filler is different from the transparent panel 20.

The transparent panel 20 is connected to the metal housing body 40 with the filler 30 for improving the sealing effect. Additionally, the support portion 33 supports the transparent panel 20. This design can keep the transparent panel 20 secure and stably positioned on the housing body 40 for a long period of time.

A method for manufacturing the housing 10 is described as follows.

An injection mold is provided. The metal housing body 40 is positioned in a die chamber of the injection mold. The transparent panel 20 is received in the housing body 40. The top surface of the transparent panel 20 is coplanar with the flange portion 42 of the housing body 40. Molten material is injected into a clearance between the transparent panel 20 and the housing body 40 to form the filler 30 including the support portion 32. After the injection molding process, the transparent panel 20 is tightly bonded with the metal housing body 40 to form the housing 10.

The transparent panel 20 and the housing body 40 are integrally formed together by the above method. The method for manufacturing the device housing 10 by injection molding increases processing efficiency and reduces production time. Additionally, the transparent panel 20 is stably positioned on the housing body 40 and has a good seal.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A housing comprising:
    a rectangular transparent panel;
    a housing body including a rectangular main body and a peripheral flange portion extending from the main body, the rectangular transparent panel positioned in the housing body, a first clearance defined between the peripheral flange and the transparent panel, and a second clearance defined between the main body and the transparent panel;
    a filler made of moldable material formed between the transparent panel, and the rectangular main body and the peripheral flange portion of the housing body, the filler including a first connecting portion, a second connecting portion, and a support portion integrally formed together, the first connecting portion filled into the first clearance for connecting the transparent panel to the flange portion, the support portion perpendicularly extending from the second connecting portion for bonding an underside of the transparent panel, and the second connecting portion filled into the second clearance for connected to the main body.

2. The housing as claimed in claim 1, wherein the transparent panel is made of glass or plastic.

3. The housing as claimed in claim 1, wherein the flange portion perpendicularly extends from the main body.

4. The housing as claimed in claim 1, wherein a clearance between the metal housing body and the transparent panel is in a range of about 0.4 mm to about 0.8 mm.

5. The housing as claimed in claim 4, wherein the clearance is 0.5 mm.

6. The housing as claimed in claim 1, wherein the first connecting portion is narrower than the second connecting portion.

7. A housing comprising:
- a rectangular transparent panel including a first surface and a second surface opposite to each other;
- a housing body including a main body, the main body having four sidewalls and defining a receiving cavity surrounded by the four sidewalls, a peripheral flange portion extending from an inner side of the four sidewalls of the main body, the rectangular transparent panel positioned in the receiving cavity of the housing body, the first surface of the rectangular transparent panel being coplanar with an outside surface of the peripheral flange, a first clearance defined between the peripheral flange and the transparent panel, and a second clearance defined between the main body and the transparent panel;
- a filler made of moldable material formed between the transparent panel, and the rectangular main body and the peripheral flange portion of the housing body, the filler including a first connecting portion, a second connecting portion, and a support portion integrally formed together, the first connecting portion filled into the first clearance for connecting the transparent panel to the flange portion, the support portion perpendicularly extending from the second connecting portion for bonding an underside of the transparent panel, and the second connecting portion filled into the second clearance for connected to the main body.

8. The housing as claimed in claim 7, wherein the main body is a rectangular frame, and the second surface of the transparent panel is higher than an inner surface of the peripheral flange.

\* \* \* \* \*